Oct. 25, 1960 G. EANNARINO 2,958,020

DIODE

Filed Aug. 15, 1956

2 Sheets-Sheet 1

Inventor
GEORGE EANNARINO
by
Mason, Kolehmainen, Rathburn and Wyss.
Attorneys

Inventor
GEORGE EANNARINO
by Mason, Kolehmainen, Rathburn and Wyss
Attorneys

United States Patent Office 2,958,020

Patented Oct. 25, 1960

2,958,020

DIODE

George Eannarino, Bloomington, Ind., assignor to Sarkes Tarzian, Inc., Bloomington, Ind., a corporation of Indiana Filed Aug. 15, 1956, Ser. No. 604,162

5 Claims. (Cl. 317—234)

The present invention relates to diodes and more particularly to semiconductor diodes which are adapted to be connected in an external work circuit by means of a clip type connector.

Communication equipment of the type commonly used in the home generally employs discharge devices or dry type selenium rectifiers to provide the necessary unidirectional operating voltage for energizing other discharge devices or transistors in the circuit. For many reasons, a dry type rectifier is preferable for use in television and radio receivers but one disadvantage of such rectifiers has been the difficulty of removing them from and inserting them in the circuit. Obviously, it is desirable to provide a dry type rectifier which could be readily inserted in and removed from a work circuit. Moreover, it is important to minimize the size of such rectifiers so as to enable a reduction in the size of the equipment in which they are used.

Therefore, a principal object of the present invention is to provide a new and improved rectifier.

Another object of the present invention is to provide a new and improved diode which is small in size and which may be readily connected into a work circuit without the use of tools.

Another object of the present invention is to provide a new and improved semiconductor diode.

A further object of the present invention is to provide a new and improved connector for facilitating the connection of a diode into a work circuit for insuring that the diode is properly polarized in that circuit.

Briefly, the above and further objects are realized in accordance with the present invention by providing a diode having a tubular insulating housing into the opposite ends of which extend terminal members for engaging the opposite sides of a unidirectional impedance means. The external portions of the terminal members are dissimilar so as to cooperate with correspondingly dissimilar spring clips of a connector, thus insuring proper polarization of the diode in a work circuit. One of the terminal members also includes a resilient means for insuring good electric contact with the semi-conductor device while at the same time facilitating the assembly of the diode so as to minimize the manufacturing cost thereof.

Further objects and advantages and a better understanding of the present invention may be had from the following detailed description with reference to the accompanying drawings, in which.

Figure 4:
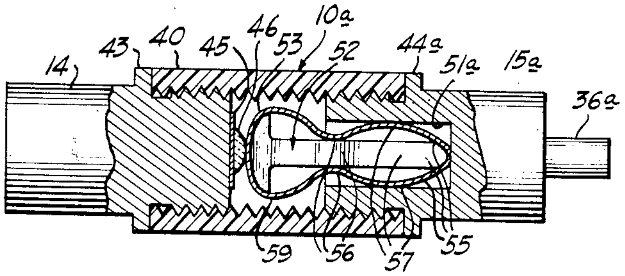
Fig. 4 is a partial sectional view of a semiconductor comprising another embodiment of the present invention.
Figures 5A, 5B, 5C, 6, 8:
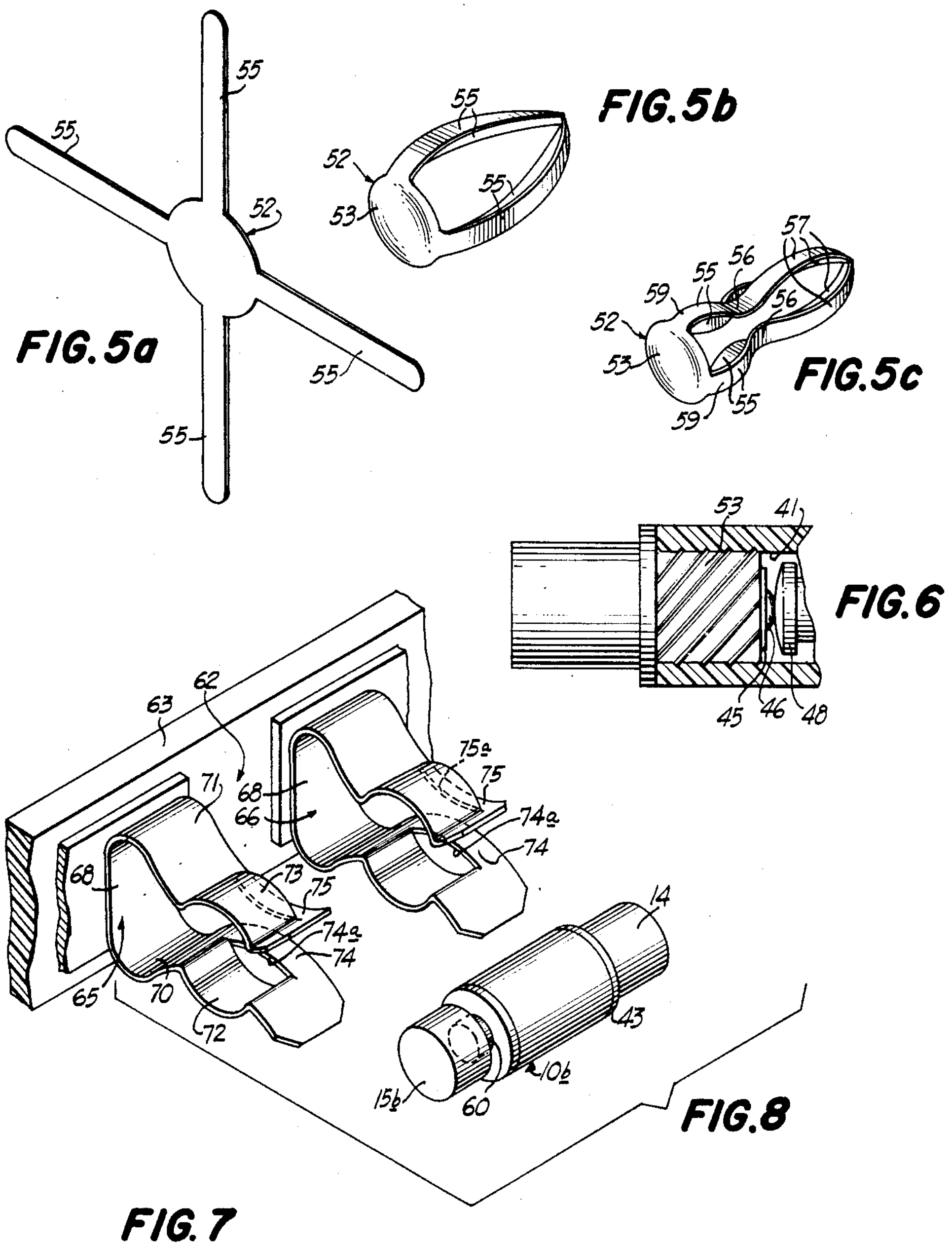
Figure 7:
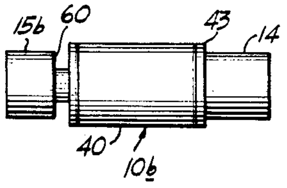

Figs. 5*a*–5*c* are a plurality of views showing the manufacturing steps employed in making a resilient contact member used in the diode of Fig. 4;

Fig. 6 is a view of an alternative form of terminal member which may be used with either of the illustrated diode constructions;

Fig. 7 is a plan view of a diode comprising another embodiment of the invention; and Fig. 8 is an isometric view of the diode of Fig. 7 and associated connector in disassembled relationship.

Figures 1, 2:
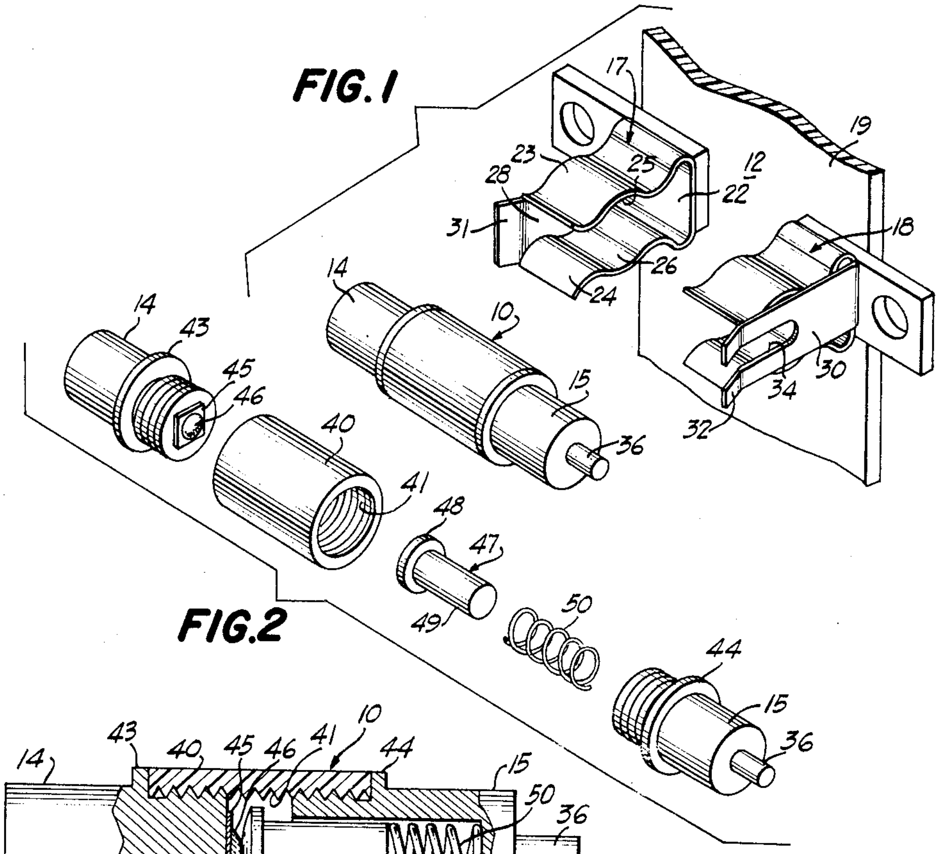
Fig. 1 is an isometric view of a semiconductor diode and associated connector in disassembled relationship.
Fig. 2 is an exploded isometric view of a semiconductor diode embodying certain features of the present invention.

Referring to Fig. 1, there is shown a cylindrically shaped diode 10 and an associated connector 12 to which the diode 10 is attached in order to connect it into a work circuit to which the connector 12 is suitably connected. As shown, the diode 10 includes a pair of axially extending terminals 14 and 15, one terminal of which is the cathode and the other of which is the anode. The terminals 14 and 15 each have a smooth cylindrical outer surface for respective reception in a set of spring clips 17 and 18 mounted in spaced apart relationship on an insulating member 19. The clips 17 and 18 may be stamped and formed from any suitable sheet metal which is sufficiently resilient in nature to hold the diode 10 in place after it has been snapped into the connector 12.

The clip 17 has a web portion 22 from which extends a pair of curved flanges 23 and 24. The flanges 23 and 24 each have concave portions 25 and 26, respectively, for engaging the terminal 14 to provide a good electric contact between the clip 17 and the terminal 14 and, moreover, to maintain the diode 10 attached to the connector 12. The clip 18 includes similar web and flange portions for engaging the terminal 15.

In order to insure that the diode 10 is properly polarized with respect to the external circuit into which it is to be connected, the clip 17 is provided with a tab 28 which extends from the web 22 across the outer edges of the flanges 23 and 24. A similar tab 30 is provided on the clip 18. In their normal positions, the tabs 28 and 30 are spaced apart a distance slightly less than the distance between the outer ends of the terminals 14 and 15 and the outer ends 31 and 32 of the tabs 28 and 30 are off-turned to facilitate insertion of the diode 10 into the connector 12. The tab 30 differs from the tab 28 in that it is provided with a slot 34 which opens onto the extremity of the tab for receiving a small cylindrical protrusion or tip 36 which extends axially from the terminal 15. When, therefore, the diode 10 is so orientated with respect to the connector 12 that the terminals 14 and 15 are respectively disposed opposite the clips 17 and 18, the diode 10 may be readily inserted into the connector 12. When, however, the diode 10 is reversed, it cannot be inserted into the connector 12 because the tip 36 engages the end of the tab 28. Consequently, proper polarization of the diode 10 in the external circuit is assured.

Figure 3:
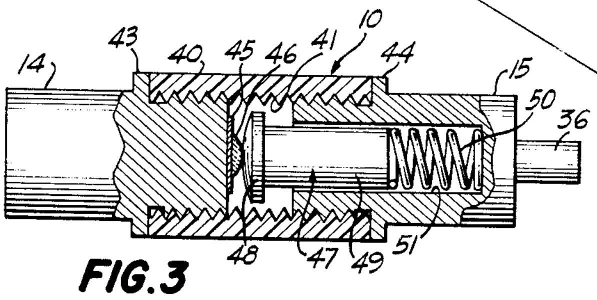
Fig. 3 is a partial sectional view of the semiconductor device shown in Figs. 1 and 2.

Referring now to Figs. 2 and 3, the diode 10 comprises a tubular housing 40 having a threaded bore 41 into the opposite ends of which extend the terminal members 14 and 15. The terminal 14 is a solid stud having an intermediate annular flange 43 which engages the end of the housing 40, and the terminal 15 is provided with a similar annular flange 44 which engages the other end of the housing 40. Any suitable bonding agent such as cement may be used to seal the terminals 14 and 15 to the sleeve 40 so as to prevent any foreign matter from getting into the diode 10. The portions of the terminals 14 and 15 which extend within the housing 40 are threaded and mate with the threaded bore 41 so as to maintain the diode 10 in an assembled condition. A unidirectional impedance device 45 is mounted on the inner end of the terminal member 14 and a contact member 47 is mounted at the inner end of the terminal 15 for resiliently engaging the device 45. Although the unidirectional device 45 may be of any suitable type, it is preferably a silicon crystal on which is located a soft metallic dot 46, the rectifying junction being provided between the dot and the crystal. Such a unidirectional impedance device is fully described in application, Serial No. 570,577—Eannarino and Finn, filed on March 9, 1956, and assigned to the same assignee as the present invention.

In order to provide a good ohmic contact with the dot 46, the contact member 47 is provided with a convex head 48, and the member 47 is electrically connected to the terminal 15 by a cylindrical shank 49 and a suitable spring 50 which are loosely positioned in a bore 51, formed in the inner end of the terminal member 15. The spring 50 is positioned between the bottom of the bore 51 and the contact button 47 so as resiliently to press the convex head 48 against the unidirectional impedance device 45, thereby to make good electrical contact between the dot 46 and the terminal 15. Although the bore 41 of the housing 40 is illustrated as being completely threaded, for rapid and automatic assembly, the bore 41 may be left untapped, in which case the terminals 14 and 15 will perform the tapping operation as they are initially twisted into the bore 41. Alternatively and as shown in Fig. 6, the terminals may be provided with a knurled portion 53 rather than a threaded portion so that a thread may be tapped in the bore by the terminals as they are initially inserted into the bore by the application of an axially directed force, no externally applied torque being necessary in this case since the knurled terminals rotate of their own accord.

Referring to Figs. 4 and 5, there is shown an alternative embodiment of the diode 10 which is designated 10*a*. The terminal 14, the housing 40, and the semiconductor device 45 are the same in the diode 10*a* as they are in the diode 10, the difference in the two diodes being in the other terminal and the contact member which is associated therewith. As shown in Fig. 4, the diode 10*a* comprises a terminal member 15*a* having an axially extending polarizing protrusion 36*a*, an annular flange 44*a* for engaging the adjacent end of the housing 40 and a bore 51*a* which may be shorter than the bore 51 in the diode 10. In order to electrically connect the terminal member 15*a* to the dot 46, there is provided a resilient contact member 52 which has a convex contacting surface 53 abutting against the dot 46 and a plurality of resilient fingers 55 extending within the bore 51*a*. The fingers 55 are bent inwardly at the locations 56 so as to provide the resilient wings 57 which resiliently press against the side walls of the bore 51*a* when the contact 52 is inserted therein. The winged portions 57 hold the contact member 52 in position in the diode 10*a* and provide a good electrical connection between the member 52 and the terminal 15*a*. The forward portion 59 of the contact member 52 provides the axial resiliency which is necessary to insure good contact with the unidirectional impedance device 45 while preventing cracking of the device when the terminals 14 and 15*a* are brought up tightly against the ends of the housing 40.

The contact member 52 may be suitably formed by stamping a star-shaped member as shown in Fig. 5*a* from a sheet of resilient conductive material, folding the fingers 55 back upon themselves to the configuration shown in Fig. 5*b* and then crimping the fingers 55 intermediate the ends thereof to provide the completed member 52 having the inwardly extending portions 53. There is thus provided a contact member which has one portion for providing a resilient outward force which holds the member 52 in the terminal 15 and a second portion for providing the axial force for resiliently engaging the unidirectional impedance device 45.

Referring now to Figs. 7 and 8, the diode 10*b* is operatively the same as the diodes 10 and 10*a* and includes a tubular housing 40 into the opposite ends of which terminal members 14 and 15*b* partially extend. The terminal 15*b* is provided with a polarizing annular groove 60 which is adapted to be received in a corresponding part of a connector 62 thereby to insure proper orientation of the diode 10*b* in the connector 62 and thus to provide proper polarization of the diode 10*b* in the work circuit to which the connector 62 is connected.

As shown, the connector 62 may suitably comprise an insulation support member or workpiece 63 on which a pair of substantially U-shaped spring clips 65 and 66 are spatially arranged. The clips 65 and 66 are conventional spring type fuse clips and each include a web or bight portion 68 from the opposite ends of which extend flanges 70 and 71 having leg portions adjacent the web or bight portion 68. Central or arm portions 72 and 73 of the flanges 70 and 71 are pressed out of the main flange to provide oppositely curved portions for engaging the terminal members of the diode 10*b*. The portions 72 and 73 extend part way across the width of the flanges 70 and 71 thereby to provide intermediate adjacent portions on each of the flanges which are of opposite curvature. The inwardly directed portions have a width slightly less than the width of the grooves 60 and are designated 74 and 75, respectively, and constitute a restricted slot means. By orienting the clips 65 and 66 on the board 62 so that the portions 74 and 75 are located at corresponding ends of the clips 65 and 66 in the assembled connector 62, the diode 10*b*, when orientated as shown in Fig. 8, may be pressed directly into the connector 62 with the strips 74 and 75 on the spring clip 65 resiliently engaging the bottom of the groove 60, and the extremity of the terminal 14 engaging the inner sides 74*a* and 75*a* of the strips 74 and 75 on the spring clip 66. If an attempt is made to place the diode 10*b* in the connector 62 when the diode is in the reverse position so that the terminal 14 is aligned with the clip 65 and the terminal 15*b* is aligned with the clip 66, the strips 74 and 75 on the spring clip 65 engage the sides of the terminal 14 adjacent the flange 43 thereon and thus prevent insertion of the diode 10*b* into the connector 62. It is apparent that when the clips 65 and 66 are used for connecting an ordinary non-polarized element such as a fuse into the work circuit, the clips 65 and 66 are placed with the strip portions 74 and 75 facing outwardly of the connector so that the ends of the terminal members on the element which is placed in the connector 62 engage the edges 74*a* and 75*a* of both spring clips 65 and 66. This manner of polarizing the diode 10*b* in the work circuit enables the use of conventional connector parts, thus reducing the cost of manufacture and distribution of the connector 62.

It will thus be seen that in accordance with the present invention there is provided a miniature diode construction which is suitable for use in radio and television receivers, which includes a minimum of parts so as to be easily assembled at a relatively low cost and which is provided with means for coacting with a novel connector arrangement for enabling the facile insertion of the diode in a work circuit.

While the invention has been described by particular embodiments thereof, it will be understood by those skilled in the art that many changes and modifications may be made without departing from the invention. Therefore, in the appended claims it is intended to cover all such changes and modifications as fall within the true spirit and scope of the invention.

What is claimed as new and is desired to be secured by Letters Patent of the United States is:

1. The combination of a tubularly shaped diode having cylindrical terminal members axially arranged at the opposite ends thereof, one of said members having an annular groove therein, and a pair of resilient spring clips adapted to receive respective ones of said terminals, said clips being arranged in spaced apart relationship along a straight line, each of said clips having cooperating flanges located on opposite sides of said line and each having adjacent portions of opposite curvature, the inwardly directed ones of said portions being provided at corresponding ends of said clips, and the width of said inwardly directed portions being less than the width of said groove.

2. The combination of a unidirectional impedance device having a plurality of axially extending terminal members, said members having external portions of dissimilar configurations, and a set of conductive spring clips engaging respective ones of said terminal members, said spring clips being identical in construction, the portions of said clips which engage said terminal members being of configurations which correspond to the dissimilar configurations of said terminal members.

3. The combination of an elongated diode having a pair of cylindrical terminal members of equal diameters axially arranged at the opposite ends thereof, one of said members having an annular groove therein, said groove being displaced a substantial distance from the end of said member and lying in a plane perpendicular to the principal axis of said terminal members, a pair of spring clips fixedly mounted with respect to one another in spaced apart relationship along a straight line, each of said spring clips comprising a pair of cooperating resilient portions disposed on opposite sides of said line, said portions on each of said clips having concave opposing surfaces, the diameter of curvature of said concave surfaces being substantially equal to the external diameter of said terminal members, said portions on each of said clips being spaced apart by a distance less than the diameter of said terminal members, each of said portions having an inwardly directed flange at one end of said concave surface, said flanges all being disposed at the ends of said portions nearest a common infinite point on said line, the width of said flanges being less than the width of said groove and the flanges on one of said clips being displaced from the flanges on the other of said clips by a distance equal to the distance between said groove and the end of the other of said terminals.

4. The combination of a tubularly shaped diode having cylindrical terminal members axially arranged at the opposite ends thereof, one of said members having an annular groove therein, and a pair of resilient spring clips adapted to receive respective ones of said terminals, said clips being arranged in spaced apart relationship along a straight line, each of said clips having cooperating flanges located on opposite sides of said line and each having a first portion of outwardly directed curvature and a second inwardly directed portion, the inwardly directed ones of said portions being provided at corresponding ends of said clips, and the width of said inwardly directed portions being less than the width of said groove.

5. A combination comprising a pair of substantially non-symmetrical and identical clips mounted on a workpiece adjacent to and spaced from each other in identically orientated relation, and a unidirectional impedance device having oppositely disposed terminals and requiring predetermined orientation, said terminals respectively being retained by said clips, each of said clips comprising a generally U-shaped body having opposed leg portions and a bight portion, said U-shaped member being disposed on said workpiece so that said leg portions are substantially parallel to and extend along said workpiece, resilient arms extending from said leg portions away from said workpiece in opposing relationship for receiving and retaining a terminal therebetween, and means defining restricted slot means between said leg portions, one of said terminals having a relatively small diameter portion disposed in the restricted slot means of the clip associated with said one terminal, another portion of said one and the other said terminals having a diameter greater than said relatively small diameter portion, and said restricted slot means having a width less than said greater diameter so as to positively insure proper orientation of the terminals.

References Cited in the file of this patent

UNITED STATES PATENTS

| | | |
|---|---|---|
| 1,908,800 | Utne | May 16, 1933 |
| 2,431,348 | Skinker | Nov. 25, 1947 |
| 2,625,592 | Sueur et al. | Jan. 13, 1953 |